United States Patent
Kakino

(10) Patent No.: US 10,078,828 B2
(45) Date of Patent: Sep. 18, 2018

(54) COMMODITY REGISTRATION APPARATUS AND COMMODITY REGISTRATION METHOD

(71) Applicant: TOSHIBA TEC KABUSHIKI KAISHA, Shinagawa-ku, Tokyo (JP)

(72) Inventor: Tomonari Kakino, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 15/202,691

(22) Filed: Jul. 6, 2016

(65) Prior Publication Data

US 2016/0314450 A1 Oct. 27, 2016

Related U.S. Application Data

(62) Division of application No. 14/468,474, filed on Aug. 26, 2014, now Pat. No. 9,412,045.

(30) Foreign Application Priority Data

Aug. 30, 2013 (JP) .................................. 2013-179383

(51) Int. Cl.
*G06K 9/00* (2006.01)
*G06Q 20/20* (2012.01)
(Continued)

(52) U.S. Cl.
CPC ..... *G06Q 20/208* (2013.01); *G06F 17/30259* (2013.01); *G06K 7/10861* (2013.01);
(Continued)

(58) Field of Classification Search
CPC ...... G06Q 20/208; G06K 9/78; G06K 9/6202; G06K 9/00993; G06K 9/6256; G06K 7/10861; G06F 17/30259
(Continued)

(56) References Cited

U.S. PATENT DOCUMENTS 7,159,545 B2 * 1/2007 Miyakoshi .......... F02D 13/0219
123/347
8,302,862 B2 11/2012 Sugita
(Continued)

FOREIGN PATENT DOCUMENTS

| JP | 2012-053784 | 3/2012 |
|---|---|---|
| JP | 2013-089084 | 5/2013 |

OTHER PUBLICATIONS

Non-Final Office Action for U.S. Appl. No. 14/468,474 dated Sep. 18, 2015.
(Continued)

*Primary Examiner* — Aaron W Carter
(74) *Attorney, Agent, or Firm* — Amin, Turocy & Watson LLP

(57) ABSTRACT

A commodity is learnt and stored in an HDD on the basis of a commodity image captured by an image capturing section. Commodity registration is carried out through a key input. The commodity which is not stored in the HDD yet is stored in the HDD as commodity data when the commodity registration is carried out through a key input, in this way, the registration as a learnt commodity is realized. Then the target commodity captured by the image capturing section is read from the commodity data stored in the HDD. In this way, the commodity image can be added and learnt based on that the unregistered commodity is input through a key operation by the operator.

20 Claims, 3 Drawing Sheets

(51) Int. Cl.
  *G06K 9/62* (2006.01)
  *G06F 17/30* (2006.01)
  *G06K 7/10* (2006.01)
  *G06K 9/78* (2006.01)
(52) U.S. Cl.
  CPC ....... *G06K 9/00993* (2013.01); *G06K 9/6202* (2013.01); *G06K 9/6256* (2013.01); *G06K 9/78* (2013.01)
(58) Field of Classification Search
  USPC ........ 382/103, 181, 305; 235/375, 454, 494; 705/26.35, 27.1
  See application file for complete search history.

(56) References Cited

U.S. PATENT DOCUMENTS

| | | | |
|---|---|---|---|
| 8,342,401 B2 | 1/2013 | Hasegawa | |
| 8,505,817 B2 | 8/2013 | Iizaka | |
| 8,584,962 B2* | 11/2013 | Hasegawa | G07G 1/0045 235/375 |
| 8,944,324 B2 | 2/2015 | Iizaka et al. | |
| 9,025,816 B2* | 5/2015 | Naito | G06K 9/00208 382/103 |
| 9,036,870 B2 | 5/2015 | Sugasawa et al. | |
| 9,092,795 B2* | 7/2015 | Inagawa | G06Q 30/02 |
| 9,412,045 B2* | 8/2016 | Kakino | G06K 9/00993 |
| 2012/0018515 A1* | 1/2012 | Kakino | G06K 7/1465 235/454 |
| 2012/0048926 A1* | 3/2012 | Naito | G06K 7/1443 235/383 |
| 2012/0054052 A1* | 3/2012 | Wakebe | G06Q 20/208 705/23 |
| 2013/0057692 A1* | 3/2013 | Naito | G06K 9/00 348/150 |
| 2013/0101168 A1* | 4/2013 | Naito | G07G 1/0063 382/103 |
| 2013/0103509 A1* | 4/2013 | Naito | G07G 1/0054 705/16 |
| 2014/0023241 A1* | 1/2014 | Sugasawa | G06K 9/00624 382/110 |
| 2014/0067574 A1* | 3/2014 | Miyakoshi | G06Q 20/208 705/23 |
| 2014/0126775 A1 | 5/2014 | Kakino | |
| 2014/0153786 A1 | 6/2014 | Takeno et al. | |
| 2015/0063638 A1* | 3/2015 | Kakino | G06K 9/00993 382/103 |
| 2015/0278591 A1* | 10/2015 | Takeno | G07G 1/0054 382/110 |
| 2016/0371524 A1* | 12/2016 | Kakino | G06K 9/00 |
| 2016/0371564 A1* | 12/2016 | Kakino | G06K 9/00 |

OTHER PUBLICATIONS

Final Office Action for U.S. Appl. No. 14/468,474 dated Dec. 14, 2015.

* cited by examiner

COMMODITY REGISTRATION APPARATUS AND COMMODITY REGISTRATION METHOD

CROSS-REFERENCE TO RELATED APPLICATIONS

This application is a Division of application Ser. No. 14/468,474 filed Aug. 26, 2014, the entire contents of which are incorporated herein by reference.

This application is based upon and claims the benefit of priority from Japanese Patent Application No. 2013-179383, filed Aug. 30, 2013, the entire contents of which are incorporated herein by reference.

FIELD

Embodiments described herein relate to a commodity registration apparatus, which recognizes a learnt commodity through an image recognition module from a captured commodity image, and a commodity registration method.

BACKGROUND

In a conventional commodity registration apparatus, a learnt commodity in the commodities attached with no barcode is registered through an image recognition module. While an unlearnt commodity in the commodities attached with no barcode is registered through a PLU (Price Look Up) key.

In the conventional technology, an operator makes a determination mistake to try to carry out commodity registration through the image recognition module even for an unlearnt commodity. In this case, the operator has to carry out commodity registration again through the PLU key after failing in recognizing the unlearnt commodity through the image recognition module, which leads to a problem that the inefficient work is repeatedly carried out and the waiting time taken in the settlement becomes longer.

DETAILED DESCRIPTION

In accordance with one embodiment, a commodity registration apparatus comprises an image capturing module configured to capture an image of a commodity; a commodity learning and storing module configured to learn and store a commodity on the basis of the image; a commodity-recognition registration module configured to recognize and register a pre-stored commodity based on an image captured by the image capturing module; and a commodity registration key input module configured to carry out commodity registration through a key input; wherein the commodity which is not stored by the commodity learning and storing module is registered in the commodity learning and storing module based on the commodity registration operation of the commodity registration key input module.

In accordance with one embodiment, a commodity registration method includes capturing an image of a commodity; learning and storing a commodity on the basis of the image; recognizing and registering a pre-stored commodity based on the captured image; and carrying out commodity registration through a key input; wherein the commodity which is not stored by the commodity learning and storing module is registered in the commodity learning and storing module based on the commodity registration operation of the commodity registration key input module.

Hereinafter, the embodiment is described in detail with reference to the accompanying drawings.

Figure 1:
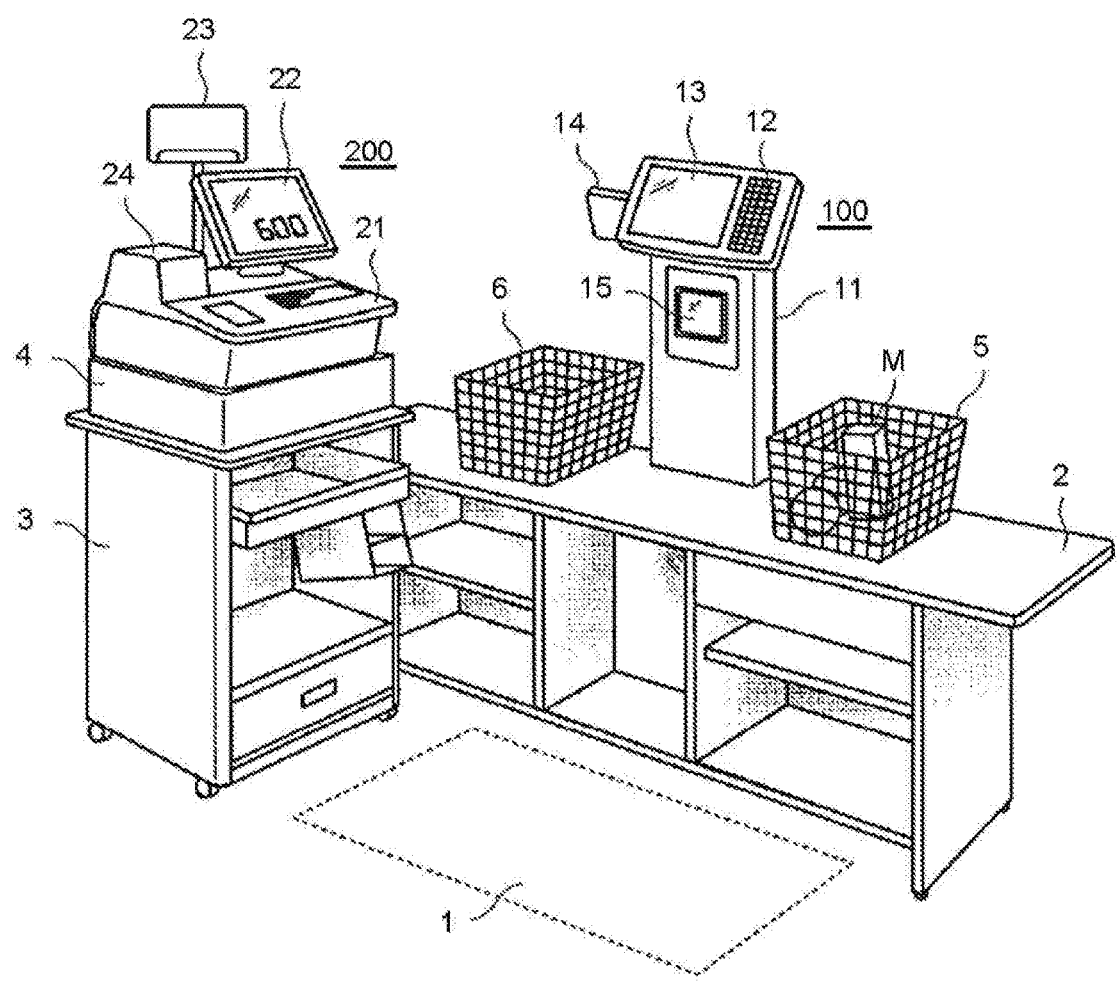
FIG. 1 is an external view illustrating a commodity registration apparatus according to one embodiment.

FIG. 1 is an external view illustrating the commodity registration apparatus according to the embodiment. A register arranged in a supermarket and the like can be listed as an application example of the commodity registration apparatus. The register is provided with a registration apparatus 100 used in the commodity registration and a POS (Point Of Sales) terminal 200 used in the settlement of the registered commodity, which are arranged facing a work area 1 of a cashier serving as a shop clerk in charge of checkout job.

The registration apparatus 100 is fixed on the checkout counter 2. The POS terminal 200 is carried on a register table 3 through a drawer 4. The registration apparatus 100 and the POS terminal 200 are connected with each other through a communication cable 7 (refer to FIG. 2).

The checkout counter 2 is formed in an elongated shape along a customer path located at the rear side thereof. The register table 3 is arranged at the nearer side of the checkout counter 2 at a substantially right angle to the checkout counter 2. Specifically, the register table 3 is located at the end part of the checkout counter 2 at the downstream side of the movement direction of a customer moving along the checkout counter 2. Therefore, the checkout counter 2 and the register table 3 are arranged in an L-shape to define the work area 1 for a casher.

The POS terminal 200 is provided with a keyboard 21, an operator display 22, a customer display 23, a receipt printer 24 and the like as devices required to carry out commodity settlement.

The registration apparatus 100 is provided with a barcode reading device 11, a keyboard 12, an operator display 13, a customer display 14 and the like as devices required to carry out commodity registration.

The barcode reading device 11, which is formed in a cuboid box shape, is vertically arranged at the approximate center of the checkout counter 2 in such a manner that the long axis thereof is perpendicular to the surface of the checkout counter 2. The barcode reading device 11 can also read a QR code (registered trademark) and the like serving as an optical code as well as the barcode serving as an optical code. No specific limitation is given to the code reading device as long as it can read the code attached to the commodity.

The keyboard 12 and the operator display 13 are arranged at the upper portion of the barcode reading device 11 in a manner of being directed to the work area 1. The customer display 14 is arranged at the upper portion of the barcode reading device 11 in a manner of being directed to the side opposite to the work area 1.

A rectangular-shaped reading frame 15 is formed in one surface of the barcode reading device 11 facing the work area 1. LED light sources (not shown) are arranged at the upper side and the lower side of the reading frame 15 as irradiation modules for irradiating the commodity held in a barcode reading area surrounded by the reading frame 15.

A first upper surface portion of the checkout counter 2 at the upstream side thereof through the barcode reading device 11 in the customer movement direction serves as a space for placing a shopping container 5 in which a commodity M purchased by a customer is held. On the other side, a second upper surface portion at the downstream side through the barcode reading device 11 serves as an another space for placing a shopping container 6 in which a commodity M registered by the barcode reading device 11 is held.

The cashier in the work area 1 takes out the commodity M held in the shopping container 5 one by one and holds the surface of the commodity M on which a barcode is attached over the reading frame 15 of the barcode reading device 11. If the barcode is recognized by the barcode reading device 11, the commodity M is put into the shopping container 6. The foregoing work is carried out repeatedly for each commodity M held in the shopping container 5, and after the work is completed, the POS terminal 200 is operated to carry out settlement processing.

Figure 2:
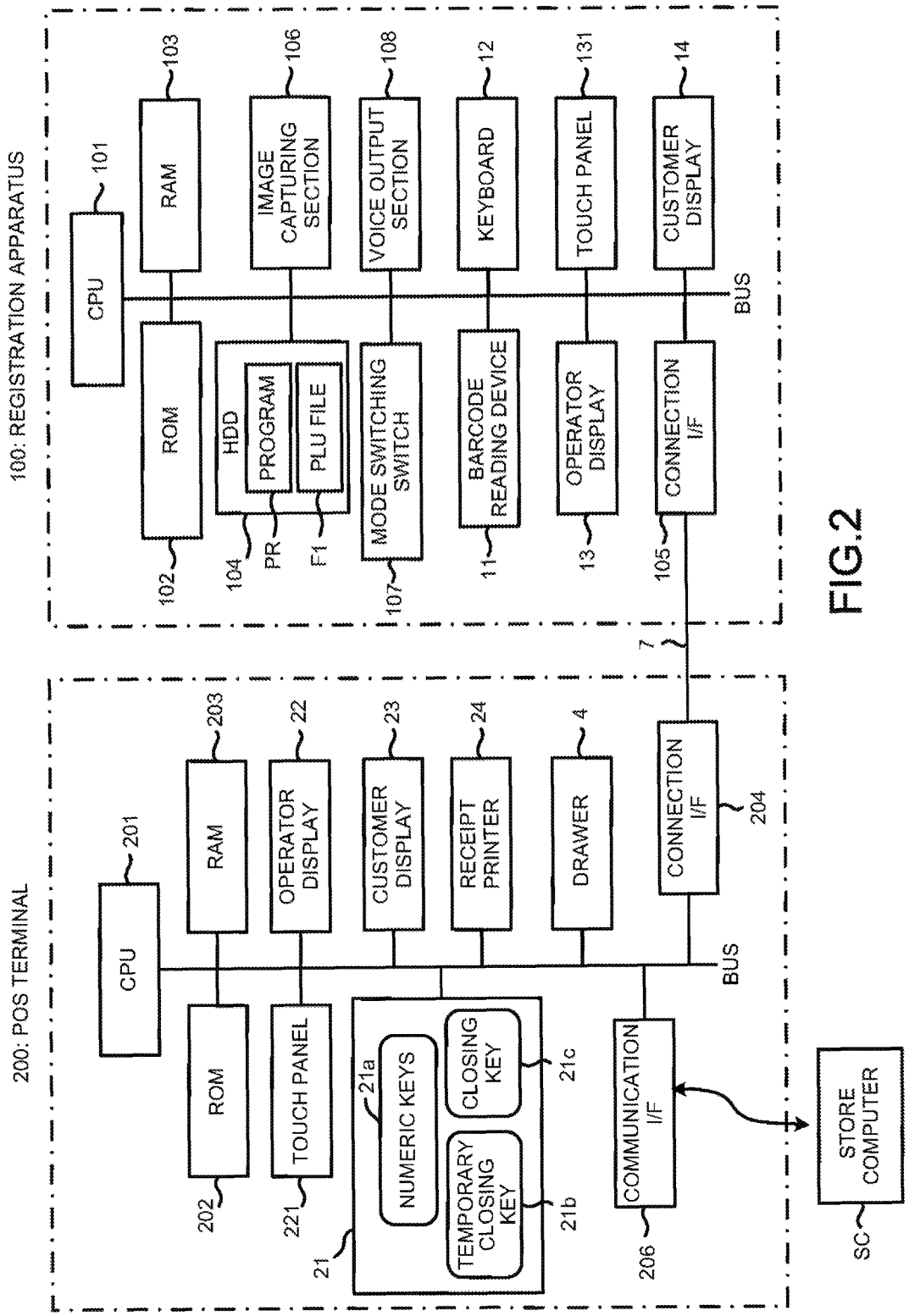
FIG. 2 is a block diagram illustrating the hardware constitution of the registration apparatus shown in FIG. 1.

FIG. 2 is a block diagram illustrating the hardware constitutions of the registration apparatus 100 and the POS terminal 200.

The registration apparatus 100 adopts a technology of general object recognition for detecting a general object such as a "car" or "vegetables" from an image. In such a technology, the category and the like of a target object is recognized from image data obtained by photographing the object with a camera.

The registration apparatus 100 carries a CPU (Central Processing Unit) 101 as a control section main body. The CPU 101 extracts appearance feature amount of the object contained in the image from image data. The CPU 101 compares the extracted appearance feature amount with the feature amount data of a reference image registered in a recognition dictionary file to calculate a similarity degree, and then recognizes the category and the like of the object based on the similarity degree. The technology for recognizing the object contained in an image is disclosed in, for example, Japanese Unexamined Patent Application Publication No. 2013-120482.

In addition, the technology carrying out the image recognition by area division of the image for each object is described in, for example, Japanese Unexamined Patent Application Publication No. 2009-123234 and Re-publication of PCT International Publication No. 2007/069393.

The CPU 101 is connected with an ROM (Read Only Memory) 102, an RAM (Random Access Memory) 103, an HDD (Hard Disk Drive) 104 and a connection interface 105 through a bus line such as an address bus, a data bus and the like.

The CPU 101 is further connected with an image capturing section 106, a mode switching switch 107, a voice output section 108, the barcode reading device 11, the keyboard 12, the operator display 13, a touch panel 131 and the customer display 14 through various input/output circuits (not shown). The CPU 101 is connected, via the connection interface 105, with a connection interface 204 in the POS terminal 200 to be capable of communicating.

The ROM 102 stores programs executed by the CPU 101. The RAM 103 functions as a main storage section of the registration apparatus 100. The HDD 104 functions as an auxiliary storage section. The HDD 104 may be a SSD (Solid State Drive) and the like.

The HDD 104 stores a program PR and various files of the registration apparatus 100 and the POS terminal 200. When the registration apparatus 100 is started, all or part of the program and various files stored in the HDD 104 are developed on the RAM 103 and then executed by the CPU 101 in sequence.

The program PR for the commodity sales data processing is one example of the program stored in the HDD 104. A PLU file F1, in which commodity data containing at least the commodity code and the commodity name of a commodity transmitted and stored from a store computer SC is registered, is one example of the file stored in the HDD 104.

The PLU file F1 is a commodity file in which the association between the information relating to the sales registration of the commodity M and the captured image of the commodity M is set for each commodity M displayed and sold in the store.

Figure 3:
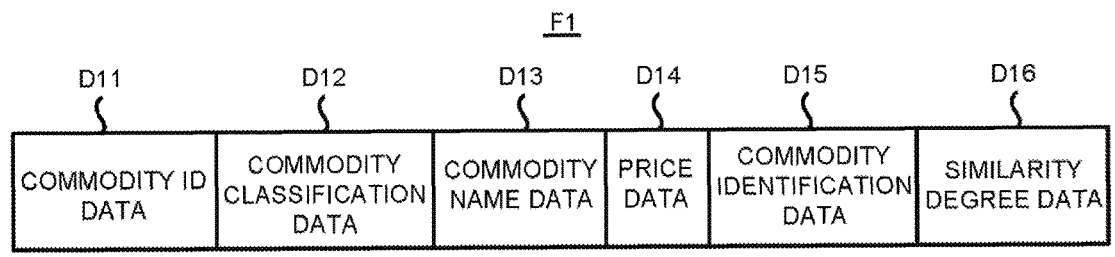
FIG. 3 is an illustration diagram illustrating one example of a PLU file.

As shown in FIG. 3, commodity ID data D11, commodity classification data D12, commodity name data D13, price data D14, commodity identification data D15 and similarity degree data D16 are stored in the PLU file F1 for each commodity.

The commodity ID data D11 is uniquely assigned to each commodity M for specifying the commodity M.

The commodity classification data D12 is used to specify the classification of the commodity to which the commodity M belongs.

The commodity name data D13 is used to specify the commodity name of the commodity M.

The price data D14 is data relating to the commodity M, such as the unit price and the like.

The commodity identification data D15 is used to specify the feature amount data (data relating to the hue, appearance shape, surface concave-convex state and the like) for image recognition for specifying the commodity M from the captured image, and a code symbol such as a barcode assigned to the commodity M.

The similarity degree data D16 is the lower limit value of a threshold value in a case of specifying as the commodity M in the image recognition.

The data constitution of the PLU file F1 is not limited to the example shown in FIG. 3. For example, a typical commodity image maybe stored in advance as the commodity identification data.

The image capturing section 106, which is an image capturing module for capturing an image, consists of illumination device using LED and the like, a camera using an image sensor such as a CMOS or a CCD, and the like. The operations of the image capturing section 106 are controlled by the CPU 101. The image capturing section 106 captures a motion image at a rate of, for example, 30 fps. The frame images (captured images) sequentially captured by the image capturing section 106 at a given frame rate are stored in the RAM 103 in sequence.

The mode switching switch 107 switches between an image recognition mode and a key input mode. It is applicable that the mode switching switch 107 is arranged on the touch panel 131 to be operated.

The voice output section 108 gives a notification through a voice such as an alarm voice and the like under the control of the CPU 101. In a case in which the operator tries to read a commodity attached with a barcode while the reading mode is the image recognition mode, the voice output section 108 serves as an error notification module for notifying the operator of the error under the control of the CPU 101. The voice output section 108 consists of a voice circuit, a speaker and the like for issuing, for example, a preset alarm voice.

In an environment where an error notification through a voice output is inconvenient, a vibration device may be arranged instead of the voice output section 108 as an error notification module. Further, the error notification module may include both the voice output section 108 and the vibration device, and switch between the voice output section 108 and the vibration device as necessary.

The operator display 13 can also be used as the touch panel 131. As to the touch panel 131 serving as a commodity registration key input module for carrying out commodity registration, the key which can be input by the operator through a touch operation is displayed on the operator display 13. The displayed key includes a PLU key for registering a commodity through one touch, a section key for combining a plurality of keys to register a commodity, an amount key and the like.

The CPU 101 is connected with the connection interface 105 which is connected with the connection interface 204 of the POS terminal 200 to enable the data transmission/reception with the POS terminal 200.

In a case in which it is detected that the PLU key is pressed according to the operation information of the touch panel 131, the CPU 101 sends the commodity code corresponding to the PLU key to the POS terminal 200. In a case in which it is detected that the section key or the amount key is pressed, the CPU 101 sends the key code of the key to the POS terminal 200, respectively.

The POS terminal 200 includes a CPU 201 serving as an information processing section for executing information processing. The CPU 201 executes various operations processing to control each section. The CPU 201 is connected with an ROM 202 and an RAM 203 through a bus line.

Though the HDD functioning as an auxiliary storage section of the RAM 203 in the POS terminal 200 is shared with the HDD 104 of the registration apparatus 100 in the present embodiment, the present invention is not limited to this, and a dedicated HDD may be arranged in the POS terminal 200.

The HDD 104 stores a program PR and various files of the POS terminal 200. When the registration apparatus 100 is started, all or part of the program and various files stored in the HDD 104 are developed on the RAM 203 and then executed by the CPU 201 in sequence. The HDD 104 can be read by the POS terminal 200 through the connection interface 204.

The CPU 201 of the POS terminal 200 is connected, through an input/output circuit (not shown), with a communication interface 206 for executing data communication with the store computer SC. The store computer SC is arranged in the backyard and the like of a store. The HDD in the store computer SC stores the PLU file F1 to be transmitted to the POS terminal 200. The communication interface 206 for executing data communication with the store computer SC may be arranged at the side of the registration apparatus 100.

The CPU 201 of the POS terminal 200 is connected, through various input/output circuits (none is shown), with the drawer 4, the keyboard 21, the operator display 22, the touch panel 221 and the customer display 23 which are controlled by the CPU 201. The touch panel 221 is the same as the touch panel 131 of the registration apparatus 100, and the key, which can be input by the operator through a touch operation, is also displayed on the operator display 22.

The keyboard 21 includes numeric keys 21a on which numeric characters such as '1', '2', '3' . . . and operators such as multiplying operator '*' are displayed, temporary closing key 21b and a closing key 21c.

The CPU 201 of the POS terminal 200 is connected with the connection interface 204 which enables the data transmission/reception with the registration apparatus 100. The connection interface 204 is connected with the registration apparatus 100. The CPU 201 is further connected with the receipt printer 24 for carrying out printing on a receipt and the like. The POS terminal 200 prints the transaction content of one transaction on a receipt under the control of the CPU 201.

Figure 4:
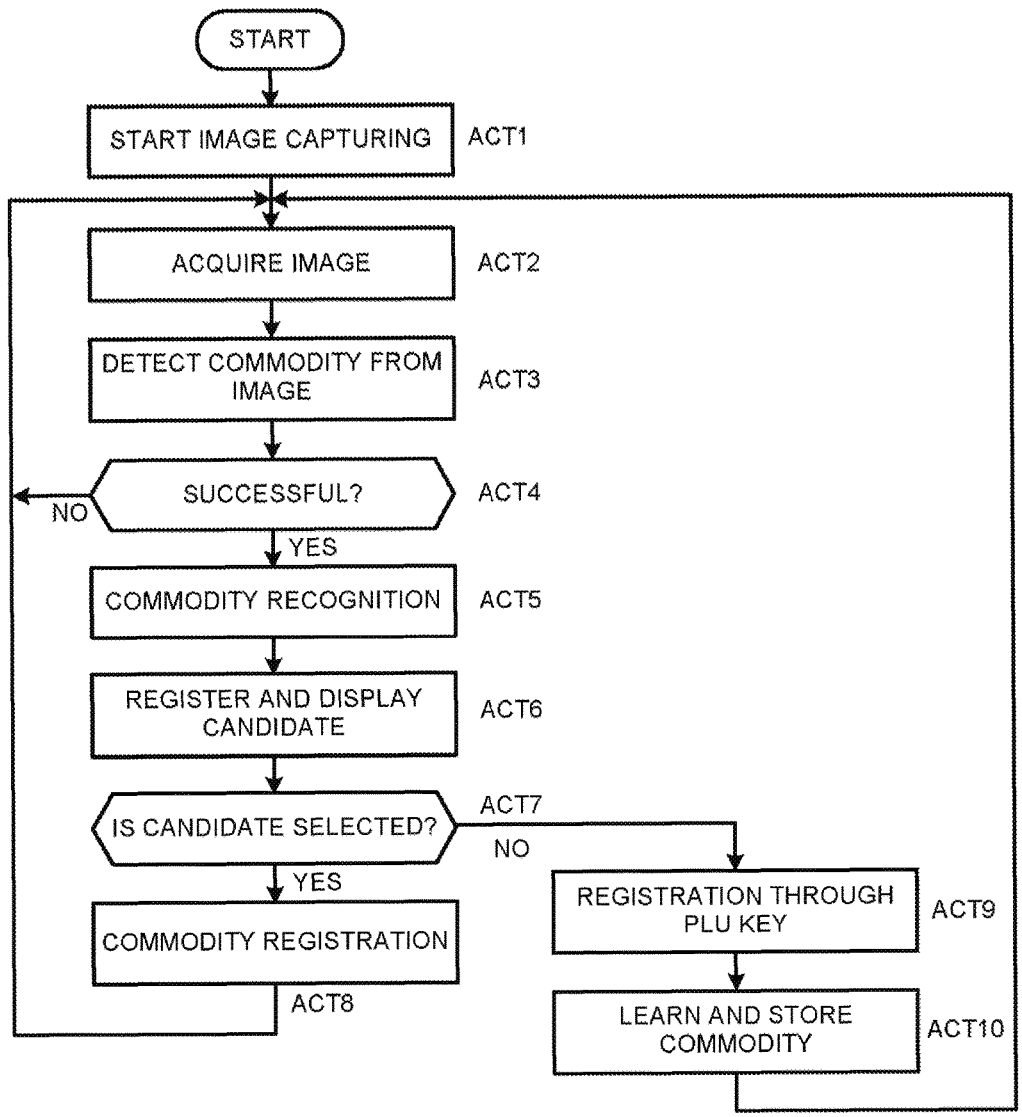
FIG. 4 is a flowchart illustrating processing operations according to the embodiment.

FIG. 4 is a flowchart illustrating the processing of the CPU 101 for learning a commodity automatically and making the commodity recognizable as a learnt commodity based on a commodity image which is not recognized successfully. Such a processing is started after the registration apparatus 100 is started.

First, the CPU 101 starts the image capturing section 106 to start to capture a commodity image (ACT 1).

The frame images captured by the image capturing section 106 are stored in the RAM 103 in sequence (ACT 2).

The CPU 101 analyzes the acquired image and carry out commodity detection every time a frame image is acquired (ACT 3). The technique based on background subtraction for carrying out commodity detection is disclosed in, for example, Japanese Unexamined Patent Application Publication No. 2009-265827 and Japanese Unexamined Patent Application Publication No. 2007-111854.

Next, the CPU 101 determines whether or not the commodity can be detected from the frame image (ACT 4).

In a case in which the commodity cannot be detected (NO in ACT 4), the CPU 101 takes ACT 2 to acquire a next frame image. In a case in which the commodity can be detected (YES in ACT 4), the CPU 101 analyzes the image, carries out a comparison with the pre-registered commodity and extracts more than one candidate (ACT 5).

One example of the commodity extraction method is described briefly. In the registration apparatus 100, feature amount obtained by acquiring and analyzing the image of a commodity to be recognized is stored in advance in the HDD 104 as dictionary data. The used feature amount is, for example, extracted through an analysis technique called as CoHOG (Co-occurrence Histograms of Oriented Gradients) which is disclosed in Japanese Unexamined Patent Application Publication No. 2012-048400 and the following technical document and indicates the appearance frequency of the combination of the brightness gradient direction at two different positions.

T. Watanabe et al., "Co-occurrence Histograms of Oriented Gradients for Pedestrian Detection", T. Wada, F. Huang, and S. Lin (Eds.): PSIVT 2009, LNCS 5414, Springer-Verlag Berlin Heidelberg, pp. 37-47, 2009.

In the registration apparatus 100, a plurality of commodities is stored in advance, and the feature amount obtained from the image captured during the operation of the registration apparatus 100 is sequentially compared with the dictionary data stored in the HDD 104, in this way, a given number (for example, four) of candidates are extracted in the descending order of similarity degree. The comparison technique includes, for example, a SVM (Support Vector Machine) disclosed in the following technical document.

V. Vapnik, "The Nature of Statistical Learning Theory", Springer, (1995).

The CPU 101 displays the extracted candidates on the operator display 13 (ACT 6).

The CPU 101 determines whether or not the operator selects any of the candidates displayed on the operator display 13 based on the operation information from the touch panel 131 (ACT 7).

If a candidate is selected (YES in ACT 7), the commodity code equivalent to the commodity is sent to the POS terminal 200 to complete the commodity registration (ACT 8), and then ACT 2 is taken to acquire a next frame image.

If no candidate is selected (NO in ACT 7), ACT 9 is taken to carry out commodity registration through the PLU key.

After the commodity registration in ACT 9 is completed, the commodity is stored in the HDD 104 as new dictionary data on the basis of the image and the commodity code of the commodity (ACT 10).

In this way, the feature amount obtained by acquiring and analyzing an image of the commodity to be recognized is stored in the HDD 104 in advance as the dictionary data. Then the feature amount obtained from the image newly captured during the operation of the registration apparatus 100 is sequentially compared with the dictionary data stored in the HDD 104, and a given number of candidates are extracted in the descending order of similarity degree.

The commodity registration apparatus has both of the barcode function and the image recognition function, which are selected by switching the mode based on the determination of the operator. Generally, the commodity is recognized by reading the barcode; however, in a case in which there is no barcode, the mode is switched to the image recognition mode. In addition, the image recognition for the difference in the quantity and the size is not considered, thus, these information is input through a key input.

In the present embodiment, the unregistered commodity is input through a key operation by the operator, and the commodity image thereof is added and learnt based on the key input, in this way, the image recognition of a new commodity can be realized.

It is exemplified in the embodiment described above that the commodity which is not stored as the dictionary data yet is registered through the PLU key, however, the present invention is not limited to this. For example, the commodity may also be registered through a section key and an amount key. In this case, new dictionary data is created on the basis of the image and the section key and amount key, and then the commodity is stored in the HDD 104.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity registration system, comprising:
an image capturing section configured to capture an image of a commodity;
a commodity learning and storing section configured to learn and store a commodity on a basis of the image;
a commodity-recognition registration section configured to recognize and register a pre-stored commodity based on an image captured by the image capturing section; and
a commodity registration input key configured to carry out commodity registration through a key input; wherein
the commodity-recognition registration section stores information of the commodity which is not in the commodity learning and storing section into the commodity learning and storing section based on operation of the commodity registration by the commodity registration input key if information of the commodity is not pre-stored in the commodity learning and storing section, the information of the commodity including information relating to an image of the image of the commodity different from a barcode.

2. The commodity registration system according to claim 1, further comprising:
a commodity detection section configured to detect whether or not there is a commodity in the image captured by the image capturing section; wherein
the commodity is learnt and stored by the commodity learning and storing section on a basis of the image in which the commodity is detected by the commodity detection section previously.

3. The commodity registration system according to claim 1, wherein
the commodity-recognition registration section analyzes the image captured by the image capturing section, carries out a comparison with the pre-registered commodity and extracts more than one commodity serving as a candidate.

4. The commodity registration system according to claim 3, wherein
the extracted commodity candidates are displayed on the operator display, and a touch panel on the display is operated to select the candidates.

5. The commodity registration system according to claim 4, wherein
the commodity code of the selected commodity candidate equivalent to the commodity is sent to a commodity settlement terminal to carry out settlement.

6. The commodity registration system according to claim 1, wherein
plural candidates extracted from the commodity-recognition registration section is listed in the decreasing order of similarities.

7. The commodity registration system according to claim 1, wherein
the commodity-recognition registration section have a bar code function and an image recognition function.

8. The commodity registration system according to claim 1, wherein
the commodity-recognition registration section have a bar code function and an image recognition function, and usually scan commodities by the bar code function.

9. The commodity registration system according to claim 1, wherein
the commodity-recognition registration section have a bar code function and an image recognition function, and usually scan commodity by the bar code function but, in the absence of the bar code function, by the image recognition function.

10. The commodity registration system according to claim 1, wherein
commodities that are not able to be recognized by the commodity-recognition registration section are registered by the commodity registration input key.

11. The commodity registration system according to claim 1, wherein
the information relating to a image is a threshold value data to specify the commodity.

12. A commodity registration system comprising:
a camera configured to capture an image of a commodity;
a memory configured to learn and store a commodity on a basis of the image of the commodity;
a commodity registration input key configured to register the commodity; and a processor configured to control a commodity-recognition registration section to store information of the commodity which is not in a commodity learning and storing section into the commodity learning and storing section based on operation of commodity registration by the commodity registration input key if information of the commodity is not pre-stored in the memory, the information of the commodity including information relating to an image of the image of the commodity is different from a barcode.

13. The commodity registration system according to claim 12, wherein
the processor configured to detect the image of the commodity in a camera image captured by the camera and learn and store information relating to the commodity on a basis of the camera image in which the commodity is detected in advance.

14. The commodity registration system according to claim 12, wherein
the processor configured to analyze the image of the commodity captured the camera, compare the image of the commodity captured the camera with the images of commodities registered in the memory in advance and extract a commodity as a candidate.

15. The commodity registration system according to claim 14, further comprising:
a display for operator configured to display information relating to the commodity extracted as candidates; wherein
the processor displays the images of the extracted candidates and decides the image of the commodity based on operation on a touch panel on the display.

16. The commodity registration system according to claim 12, wherein the processor analyzes the image of the commodity each time the image of the commodity is captured by the camera.

17. The commodity registration system according to claim 12, wherein the information relating to the image of the image of the commodity is a threshold value data to specify the commodity.

18. A commodity registration method comprising:
capturing an image of a commodity by a camera,
learning and storing information of a commodity on a basis of the image into a memory,
recognizing and registering a pre-stored commodity based on an image captured by the camera,
carrying out commodity registration through a key input,
storing information of the commodity which is not in the memory into the memory based on operation of the commodity registration by the key input if information of the commodity is not pre-stored in the memory, the information of the commodity including information relating to an image of the image of the commodity different from a barcode.

19. The commodity registration method according to claim 18, further comprising:
if detecting the image of the commodity in a camera image captured by the camera, comparing the image of the commodity captured the camera with information of the memory which learn on a base of the image of commodity,
displaying the candidates of the commodities based on the comparing,
storing information relating to the image of the image of the commodity at a timing of determination of the commodity on a base of the displaying.

20. The commodity registration method according to claim 18, wherein
the information relating to the image of the image of the commodity is a threshold value data to specify the commodity.

* * * * *